United States Patent [19]

Emily

[11] Patent Number: 4,953,482
[45] Date of Patent: Sep. 4, 1990

[54] MULCHING AND SEEDING APPARATUS AND METHOD WITH FILM SEVERING AND COVERING

[75] Inventor: Jean Y. Emily, Landerneau, France

[73] Assignee: Atochem, Paris, France

[21] Appl. No.: 862,360

[22] PCT Filed: Jul. 17, 1985

[86] PCT No.: PCT/FR85/00195
 § 371 Date: Jul. 17, 1986
 § 102(e) Date: Jul. 17, 1986

[87] PCT Pub. No.: WO86/00780
 PCT Pub. Date: Feb. 13, 1986

[30] Foreign Application Priority Data
 Jul. 18, 1984 [FR] France .................................. 84 11617

[51] Int. Cl.5 ................................................. A01C 5/06
[52] U.S. Cl. ......................................... 111/144; 47/9; 111/102
[58] Field of Search ........................ 47/9, 56; 111/1, 2, 111/3, 102, 112, 144, 164, 178, 189

[56] References Cited

U.S. PATENT DOCUMENTS

| | | | |
|---|---|---|---|
| 3,204,589 | 9/1965 | Blackhorst et al. | 47/9 X |
| 3,468,267 | 9/1969 | Morris et al. | 47/9 X |
| 3,559,599 | 2/1971 | Hoadley | 47/9 X |
| 3,751,821 | 8/1973 | Olmo et al. | 47/9 X |
| 3,791,321 | 2/1974 | Tsutsumi | 47/9 X |
| 4,117,787 | 10/1978 | Pavan | 47/9 X |
| 4,285,161 | 8/1981 | Kawasaki et al. | 47/9 |

FOREIGN PATENT DOCUMENTS 174223A  3/1986  European Pat. Off. ................. 47/9

Primary Examiner—Richard T. Stouffer
Attorney, Agent, or Firm—Sigalos, Levine & Montgomery

[57] ABSTRACT

An agricultural machine and method for applying and securing a plastic film onto a seed bed. The machine includes a cutter that severs the plastic film at the end of a row or other area for which covering is desired, while covering the severed ends so as to anchor them to the soil.

8 Claims, 4 Drawing Sheets

MULCHING AND SEEDING APPARATUS AND METHOD WITH FILM SEVERING AND COVERING

BACKGROUND OF THE INVENTION

This invention relates to a machine for applying a plastic film on the ground, and more specifically, an agricultural implement provided with means for securing and anchoring the film to the ground when the machine turns about at the ends of a field.

Mulching apparatus for applying a photodegradable plastic film, or mulch, on seed beds are getting more and more widespread. Such machines are described in the following French Patents which are given as an illustration: Nos. 1 356 657, 2 427 780, 2 476 970, 2 452 871, 2 453 600 and 2 483 380.

These machines are suitably secured to a 3-point hitching arrangement behind a farm vehicle such as a tractor. They include main framing members which are fitted with a roll of film passing around a pair of laterally spaced press wheels which seat the edges of the film into two parallel side furrows opened in the soil by plowing means fitted on the machine in front of the lateral spaced press wheels. Behind these, closing furrow ploughshares cover up the side edges of the film with soil or dirt so as to anchor it. Behind the press wheels are usually placed seed-wheels which are also fitted with piercing means to penetrate the film and place seed in the soil. Also, some machines are adapted with knifes which will enable cutting of the film automatically at the end of the row.

At the end of the row, the whole apparatus is raised up from the ground by the 3-point hitch of the tractor. The film can then be cut or severed from the film roll at a point behind the press wheels but the part of the film which has already been unwound from the film roll or reel is creased or ruined while the tractor turns about and moves to the beginning of the next seed bed row before starting off again. The film then has to be replaced under the spaced press wheels which is not an easy matter. The film can also be cut in front of the lateral press wheels but, in this case, before the vehicle commences moving, a piece of film long enough to enable it to be positioned correctly under the press wheels will have to be unwound by hand. All these operations are strenuous because the seed wheels do not allow easy access to the film roll thereby requiring a loss of time and one or two people for the job. Since usually two or four devices are placed in parallel behind a tractor, it is still more difficult to get near the film to perform the needed tasks indicated above.

A first object of the present invention is to provide a means of eliminating nearly all the manual film operations required at the end of a row and to enable the tractor's operator to perform all these steps without moving from his seat.

According to one of the objects of the invention, it is planned to provide a mulching machine on which, behind the press wheels, is adapted, at the extremity of arms which are pivotably mounted around a crosswise horizontal axis, a crosswise shovel-like cutter blade. These arms are fixedly attached to parallel piston jacks which are integrated into the main frame part of the apparatus. The rotating axis height of the jacks can be adjusted depending on the ground, so as to make the jacks orient the cutter above the ground when the vehicle is moving or in a seeding position. When the vehicle is no longer moving, as when it has reached the end of the seed bed row, the jacks will make the cutters perform through an arc of a circle downwardly into the ground and rearwardly during which the cutter blade cuts the film from the roll or reel to leave a ground end and a reel end, folds the ground end of the film backwards on itself and gathers and deposits some soil on the folded ground end. When the device is in a start up position at the beginning of the next row, the jacks will make the cutter perform in reverse; that is, through an arc of a circle downwardly into the ground and forwardly to deposit some soil on the reel end of the film to be laid on the new seed bed.

According to another object of the present invention, the cutter has a Y-profile formed by the blade and mould boards so that the blade can both cut and carry soil.

According to another object of the present invention, it is planned to connect to the frame behind each press wheel a wheel blocking element attached at the end of a rod like member which pivots around a horizontal axle and is driven by a jack. The width of the blocking element is about the same as that of the press wheel, the rod's axis is located slightly behind axis of the press wheels, and the length of the rod is about the same as the press wheel's radius. The blocking element is formed perpendicular to the rod and can be rotated clockwise to engage and lock the respective press wheel to prevent it from turning.

According to another characteristic of the invention, the plowing means which forms each laterally spaced furrow consists of a plowing disc whose axis is oriented so that its meeting point with the axis of the other plow disc will be situated to the front of the plow discs. Such orientation causes soil to be moved inwardly of the machine to form a soil bed. A transversal press roll for compacting the soil bed has its axle supporting, at each extremity, a concave disc facing to the outside. The center cap of each concave disc penetrates inside the press roll cylinder with the roll and concave disc turning loose around said axle to form and shape the soil into a soil bed. Behind each concave disc a press wheel is located with its lower edge at a level with the bottom of the furrow.

According to another characteristic of the invention, a film dispenser means is added which consists of press wheels, a transversal cylinder turning loosely, a film spool or reel resting on the press wheels and the film which is unwound from the reel is laid down in a path around the loosely turning transversal cylinder and beneath the press wheels.

BRIEF DESCRIPTION OF THE DRAWINGS

The novel characteristics of above-mentioned invention, will be more clearly apparent upon reading of the following description of the device in conjunction with the attached drawings, in which.

DETAILED DESCRIPTION OF THE DRAWINGS

Figure 1:
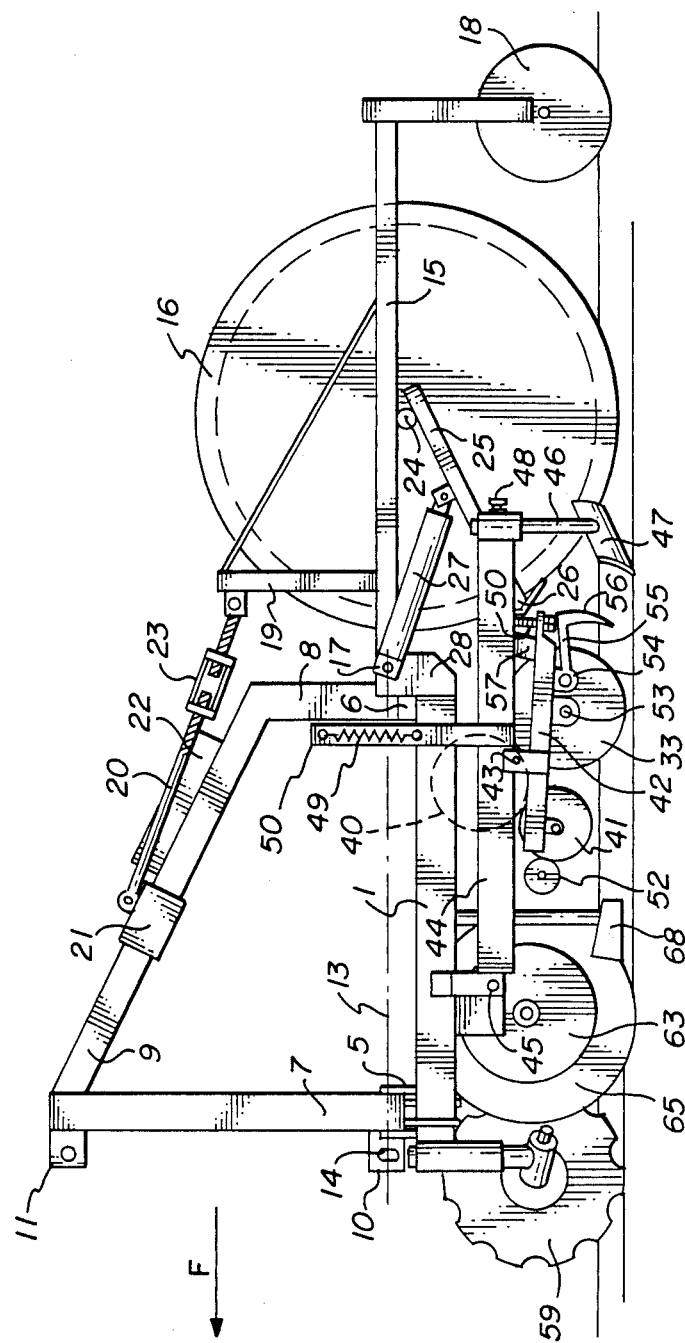
FIG. 1 is a side view of a mulcher according to the invention.
Figure 2:
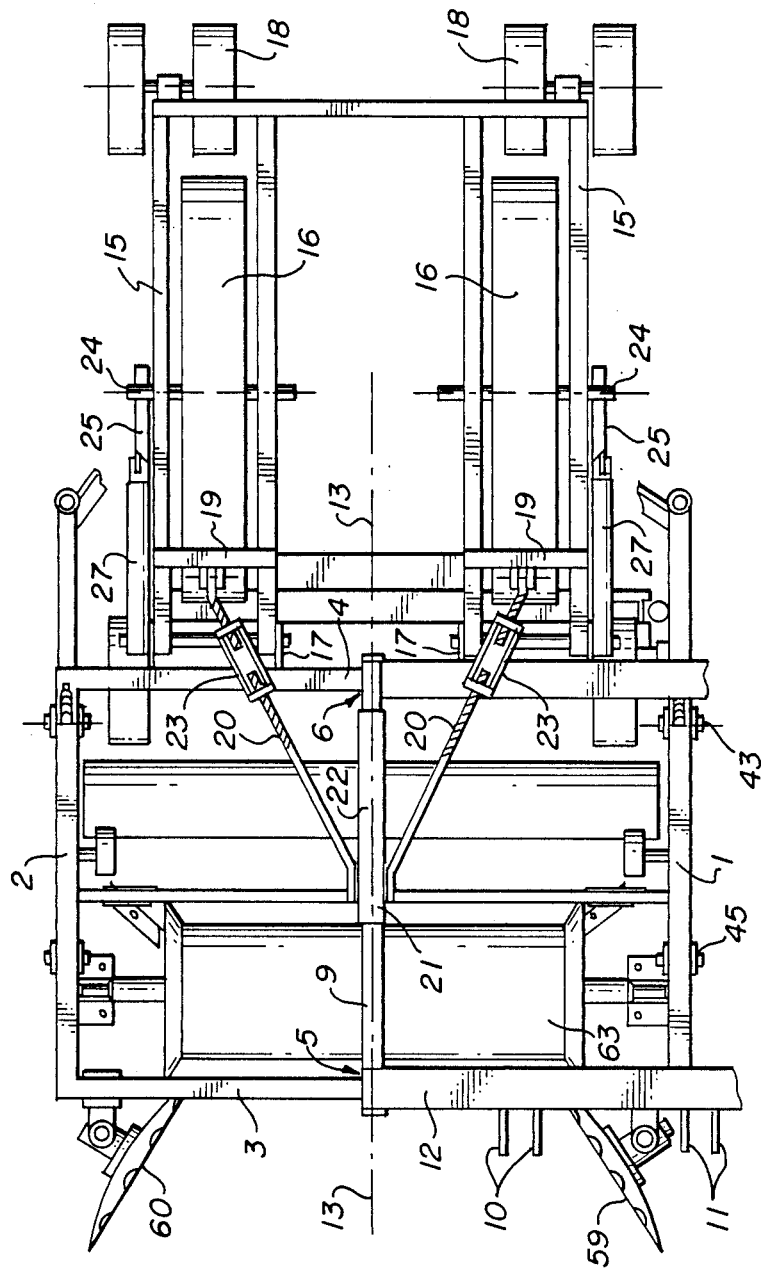
FIG. 2 is a top view of the apparatus shown in FIG. 1.

The machine, illustrated in FIGS. 1 and 2, consists of a more or less horizontal frame formed by two frame members 1 and 2 and by two cross pieces 3 and 4. The frame is connected at centers 5 and 6 of cross pieces 3 and 4 to a beam consisting of a front bearing shaft 7 and a rear bearing shaft 8, the top ends of which are connected by bracing 9. The beam is attached to a 3-point hitching system of the tractor by means including hinges 10 and 11. In FIGS. 1 and 2, only two of these hinges, lower hinge 10 and upper hinge 11, are shown but it must be realized that the other hinge is provided as necessary to form the connection points to the tractor hitching system.

When operated, bearing connections between the frame and its beam makes it possible for the frame to have a rolling movement in comparison with the beam. These bearing connections are located on FIG. 1 and 2 on discontinuous line 13. The orifices 14 for securing the hinges 10 and 11 can be oblong shaped so that the pitching angle of the frame can be adjusted in respect to the tractor. Behind cross piece 4 of the frame, elongated arms 15 are provided to which are mounted two seeding wheels 16. Arms 15 are articulated on fork yokes 17 with horizontal spindles supported by cross piece 4. Beneath the end section of arms 15 are provided wheels 18 which roll on the ground so as to support the rear part of arms 15 during the seeding operation. Arms 15 are completed by two vertical parts 19, on the top ends of which are mounted the extremities of two tension members 20 and whose other extremities are connected to a block 21 slidably mounted on bracing 9. Of course, the linkages 23 between posts 19 and tension members 20 and between tension members 20 and block 21 are rotative for adjustment purposes. Slide block 21 is connected to the rod head of a jack 22. When jack 22 is operated, it will slide block 21 along bracing 9 which pulls tension members 20. These, in turn, lift arms 15 by making them rotate about the fork yokes 17. Thus seed wheels 16 can be lifted entirely off the ground as shown in FIG. 3b. Tension members 20 are fitted with screw devices 23 making it possible to adjust position of arms 15 with respect to ground level. On the outside axis of seeding wheels 16, tips 24 are fitted with two adjacent arms 25 whose ends are linked to the ends of a transversal blade 26. Each arm 25 is connected to the rod head of a jack 27 which is attached to cross piece 4 by plate 28 which forms a part of fork yoke 17. The function of blade 26, which is of utmost importance as far as efficiency of the machine is concerned, is described in detail with respect to FIGS. 3a to 3c.

Figure 3A:
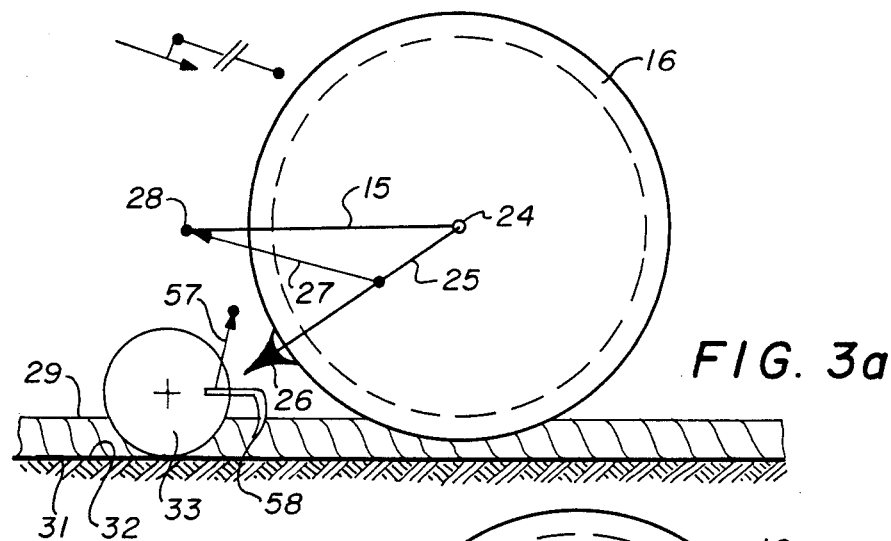
FIGS. 3a to 3c are schematic views illustrating the cutting operation of the film and the film retaining means used on the machine of FIG. 1 during operations at the end of a seed bed row and after moving the machine to the beginning of a new seed bed row.
Figure 3B:
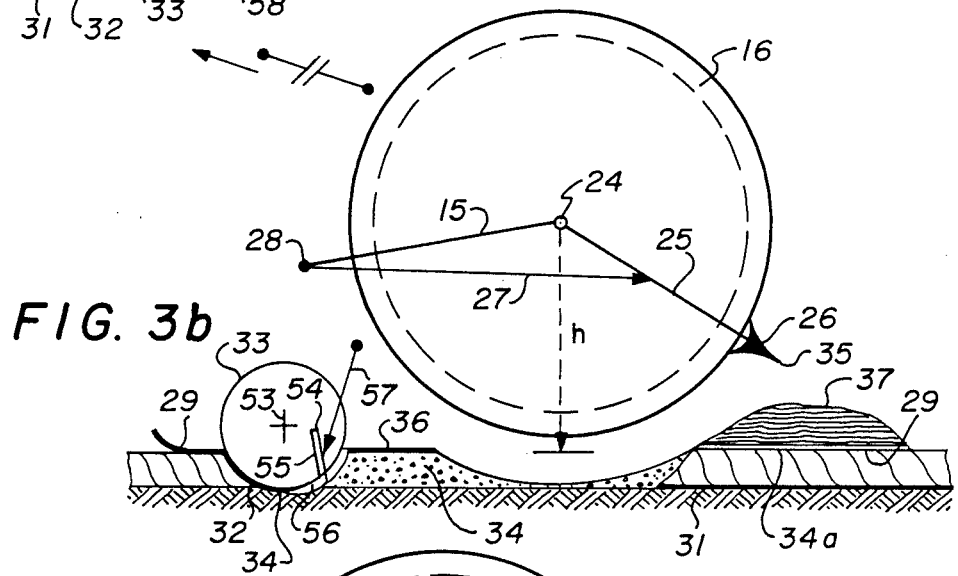
Figure 8:
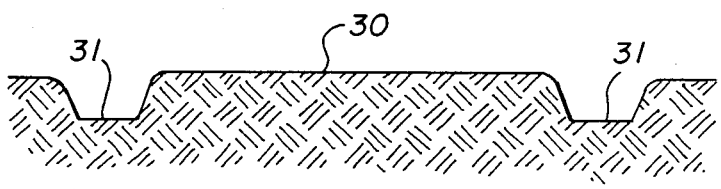
FIG. 8 is a cross section view illustrating the shape of the lateral furrows as formed by the means shown in FIG. 7.

In FIG. 3a, the machine is schematically shown during seeding operations. Film 29 is unwound from reel 40 (FIG. 3c) onto seed bed 30 and in furrows 31, at the bottom of which the film edges 32 are pressed by the wheels 33 before being buried by the soil which is carried over them by plows 47, shown in FIG. 1. Seeding wheels 16 project the seeds into seed bed 30, shown in FIG. 8, through film 29 in a well known manner. Jack 27, in FIG. 3a, (also in FIG. 1) is in a retracted position, arms 25 are extended toward the front of seeding wheels 16 and blade 26 is placed above the level of film 29 in front of seed wheels 16.

In FIG. 3b, the machine is seen in its stopped position at the end of the seed bed or row. Seeding wheels 16 are lifted up by means of jack 22 (FIG. 1) to a height, h, above the level of seed bed 30 which is slightly less than the distance between axis 24 and the end section of blade 26. Jack 27 is then driven so as to make the arm 25 perform a 120° angle, counterclockwise. When arms 25 are in operation, the low edge 35 of blade 26 comes into contact with film 29 and cuts it at 36 by sinking into the soil of seed bed 30 leaving a ground film end 34a and a reel film end 34. The ground end 34a of film 29 is carried back behind the machine and folded over. Once the stroke of blade 26 has come to its end, a soil heap 37 carried by blade 26 will be left on top of the folded ground end 34a of film 29. In this way, the applied film 29 is solidly held on the ground both by its edges being buried in the furrows and by its end part 34a being folded over and covered by the heap of soil 37. It is to be observed that adjustment of tension members 20 with screw chains 23 will enable the blade 26 to dig out more or less soil by controlling height h.

As shown in FIG. 1, behind axis 53 of each press wheel 33 is attached, beneath arm 42 an axis 54 about which a stirrup of fork 55 can pivot and at the base of which is attached a brake 56. The whole assembly 54, 55, 56 is able to move with respect to press wheel 33, like a wheel skid or brake. One arm of the fork 55 is attached to rod head end of a jack 57 which is itself secured to the frame in a well known manner, not shown. The function of skid or brake 56 is now going to be explained in detail with respect FIGS. 3a and 3c. At FIG. 3a, during seeding operations, jack 57 is retracted and lifts fork 55 and brake 56 the end 58 of which is placed above the bottom of furrow 31. At FIG. 3b, at the end of the seed bed row while the machine is stopped and while blade 26 is activated to move downwardly and rearwardly as previously explained, jack 57 then pushes fork 55 and brake 56 in a clockwise direction in FIG. 3b so that point 58 will penetrate slightly inside the bottom of furrow 31 and will carry soil and the edge 32 of the reel end 34 of the severed film beneath and into contact with press wheel 33. This results, on the one part, in holding the film end 34 against wheel 33 so that it can be lifted off the ground and, on the other part, in blocking rotation of the press wheel 33 so that film reel 40 is prevented from unwinding more film 29. In this way the machine is turned about at the field end and the entire machine in FIG. 1 is lifted off the ground by the tractor, the unwound part or reel end 34 of the film is lifted and remains secured against wheel 33 and film reel 40 is prevented from rotation because wheels 33 are blocked. Of course the length of fork arm 55 is slightly smaller than radius of wheel 33 to allow brake 56 to contact wheel 33. The length of brake 56 is planned to be sufficiently long so as to achieve a good braking means for press wheel 33. The soil which is held between point 58 of brake 56 and end 34 of the mulch film will protect and hold the film while turning of the machine takes place.

As stated previously, when the machine or device is at field end or the end of a row, the operation completed as in FIG. 3b, and the device is to be moved to the beginning of a new seed bed row to be formed, it is completely lifted off the ground by the tractor's 3-point hitch system. At FIG. 3c, at the beginning of the new seed bed row to be formed, the device is lowered back to the ground with the seeding wheels 16 remaining in their lifted position as shown. The reel end 34 of the film 29, still in the position it was in before the cutting operation was done at the end of seed bed or row as shown in FIG. 3b, is lying on the ground. Jack 27 is then driven to rotate arms 25 in a clockwise direction back to their original position as shown in FIG. 3a from the position shown in FIG. 3b and blade 26 digs the soil behind the reel end 34 of film 29 so as to stack up on it a heap of soil 39 (FIG. 3c) which will hold the starting part of the reel end 34 of the film 29 when a new row is begun. Seeding wheels 16 are then lowered down to their working position and the machine is ready to start movement. It will be noticed that the movement of blade 26 backward in FIG. 3b and forward in FIG. 3c, takes place only when the machine is stopped, first, at the end of a row and, second, at the beginning of a row. Blade 26 has a Y-shaped profile, with the lower end of the Y doing the cutting. The blade also carries the dirt to be heaped on the plastic ends 34 and 34a.

Figure 3C:
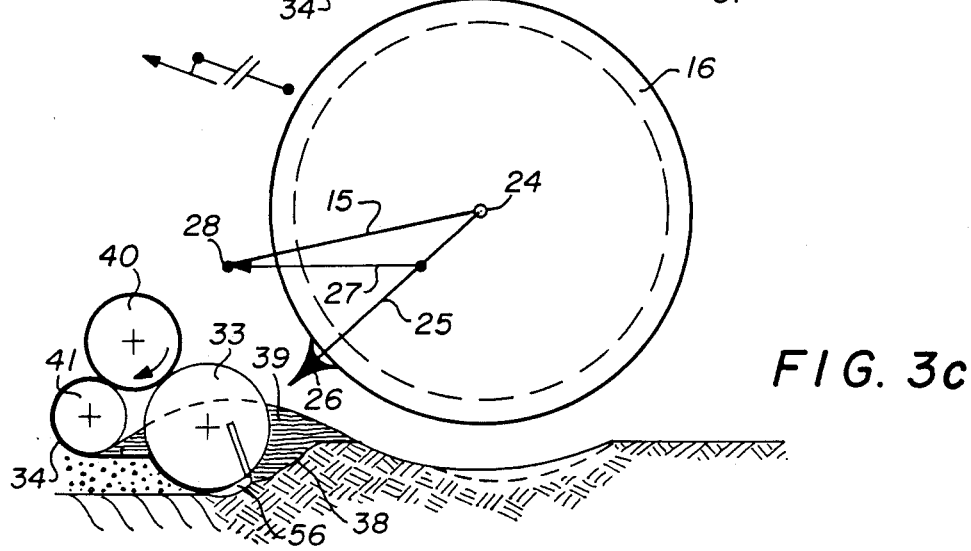

At the beginning of the new row, as shown in FIG. 3c, the machine is lowered down to the ground by means of the 3-point hitching system and is drawn forward until wheels 33, which are still blocked, come to the beginning of the seed bed which is to be mulched. At the same moment as the blade 26 is moved frontwards from FIG. 3b to its original position in front of seed wheel 16 as shown in FIG. 3a for stacking up the soil heap 39 on reel film end 34, jack 57 is made to lift up brake 56 and to bring it back in the position shown in FIG. 3a to release reel end 34 of film 29 and allow wheels 33 to again rotate. Seeding wheels 16 can then be lowered and the machine continues its seeding operation.

Figure 4:
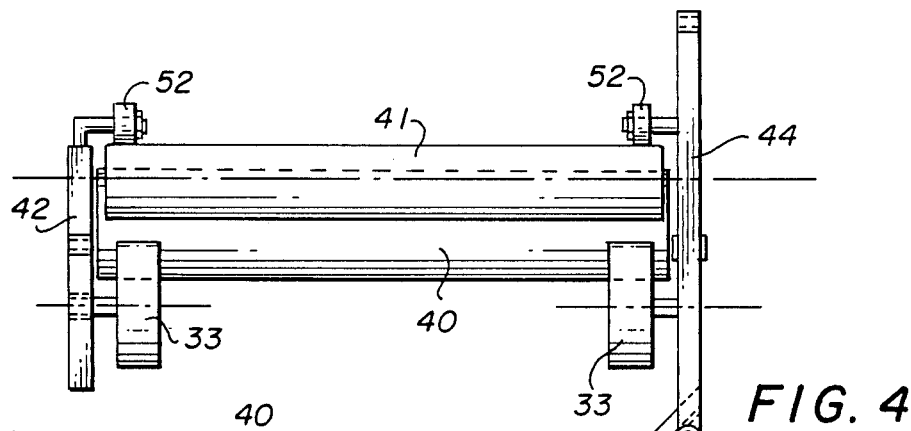
FIG. 4 is a schematic top view of the film dispenser device for a film reel used on the machine of FIG. 1.
Figure 5:
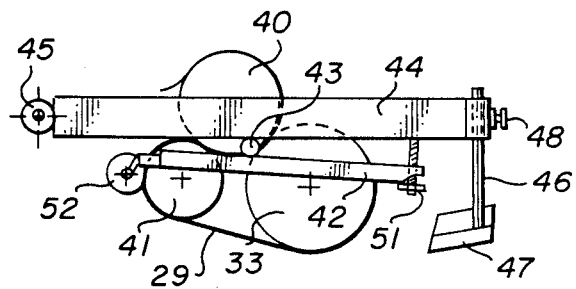
FIG. 5 is a side view of the film dispenser of FIG. 4.

FIGS. 4 and 5 illustrate the unwinding system of film reel 40. Reel 40 has one side resting loosely upon press wheels 33 and the other side resting on an unpowered or idler reel 41. The axes of wheels 33 and 41 are supported by a lateral arm 42 which is pivotably mounted on an axis 43. Axis 43 is supported by another arm 44 which has one of its ends being fixed pivotally on an axis 45 attached and located beneath the frame 1 and 2. The other end of arm 44 is linked by a rod 46 to a furrow closing ploughshare 47. The vertical position of rod 46 can be adjusted in respect to arm 44 by means of an attachment screw 48. As shown in FIG. 1, a more or less vertical spring 49 is compressed between hinge 50 which forms an integral part of the frame and arm 44 in order to apply pressure to keep ploughshare 47 firmly on the ground. The position of arm 42 compared with arm 44 is adjusted by a bolt and screw 51 which is attached vertically to one end-section of arm 42 and whose tip will protrude beneath arm 44.

Once the machine moves in direction of the arrow F of FIG. 1, the press wheel 33 run freely in a counter-clockwise direction at the bottom of furrows 31. Since the film reel 40 is lying on the press wheels 33, the peripheral speed of reel 40 is equal to that of wheels 33 so that rotation thereof, and film dispensing, is equal to the travel speed of the machine. The film 29 therefore is not subject to any kind of pressure. The film 29 is unwound and passes in front of the unpowered or idler reel 41, between it and rollers 52, then under the press wheels 33. Screw 51 will make it possible to adjust height of idler reel 41 compared to the level of seed bed 30 once arm 42 has pivoted around axis 43. For instance, reel 41 can be set to a level flush with seed bed 30 and can also be leveled transversely.

Figure 6:
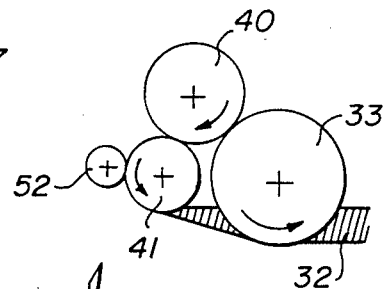
FIG. 6 is a schematic view illustrating how the mulch film dispenser operates.

It must be observed that this assembly does not apply any strong tension on the film since the peripheral speed of reel 40 is still equal to travel speed of the machine. FIG. 6 clearly demonstrates how the film unwinds.

Figure 7:
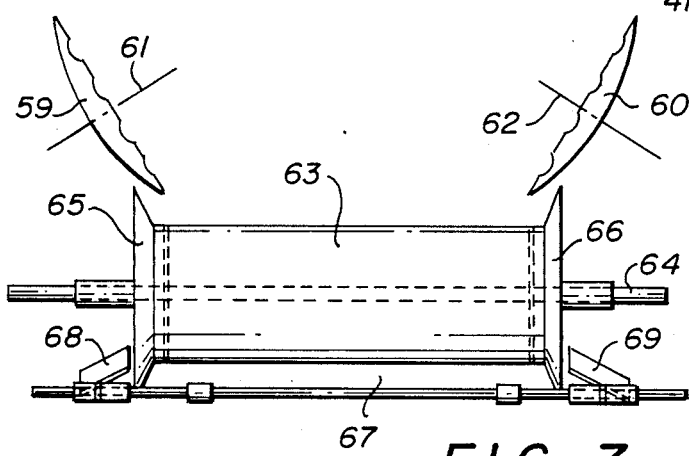
FIG. 7 is a schematic top view of the plowing and shaping elements for forming seed bed lateral furrows as used on the machine as shown in FIG. 1.

In front of the machine, FIGS. 1 and 7, are fitted two plough discs 59 and 60 whose axes 61 and 62 cross each other in front of discs 59 and 60. Discs 59 and 60 are toothed so as, on the first part, to pass more easily over the obstacles such as stones and, on the second part, to rotate more easily on the ground. Moreover, discs 59 and 60 are concave shaped in a direction facing the meeting point of their axes. They dig the furrows 31 and move the soil toward the center of the machine forming the seed bed. Behind discs 59 and 60 is placed a levelling cylinder 63 which forms the seed bed by flattening down the earth which has been moved onto the seed bed by the discs 59 and 60. The width of cylinder 63 is equal to that of the seed bed. Cylinder 63 is a hollow roller, at least at its end parts. Axis 64 of cylinder 63 is linked, on one part, to the machine frame and, on another part, to the cylinder by any adequate well known linking means. On the tips of axis 64, concave discs 65 and 66 are loosely fitted facing the outside with inner caps which penetrate inside cylinder 63. Discs 65 and 66 are meant to compact the inside edges of furrows 31 so that the film can be applied securely. Since discs 65 and 66 have a larger circumference than that of cylinder 63 and are loosely fitted thereto, their rotating speed is different to that of cylinder 63. Above cylinder 63 is attached a scraper blade 67 which will remove the earth sticking onto the cylinder 63. It is to be noted that the rotating speed difference between cylinder 63 and discs 65 and 66 will prevent the earth from collecting at the cylinder side edges. Behind discs 65 and 66, levelling blades 68 and 69 are fitted on the machine's frame which scrape the bottom of furrows 31 and throw back the soil on the exterior edge sides of the furrows. Behind the press wheels 33, blades 47, situated across the outside edge of furrows 31, throw the loose soil adjacent the edge of film 32 in the furrows so as to bury them, i.e., the edges.

Thus there has been disclosed a novel mulching and seeding apparatus which eliminates manual handling and cutting of the film when the device reaches the end of a field or a row. The film is automatically cut, the end of the film already laid in place on the seed bed is covered with dirt and the end of the film still on the machine is held in place and raised from the ground while the machine is moved to the beginning of the next row. The end of the film still on the machine is then returned to the ground, covered with dirt to hold it in place and released from the roller so the device can continue down the row laying the film in place and planting the seeds.

While this invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined by the appended claims.

I claim:

1. In a mulching and seeding apparatus for forming a soil seed bed row, depositing film on the ground over said soil seed bed row from a rotatable film reel on said apparatus, forming orifices in said film and planting seeds in said soil seed bed through said orifices in said film, the improvement comprising:
   a. severing means attached to said apparatus for severing said film from said reel at the end of a row to leave a ground film end and a reel film end, and concurrently depositing soil on said ground film end to hold said ground film end in place on said seed bed; and
   b. means on said apparatus for preventing said reel film end from being unreeled during movement of said apparatus to the beginning of another seed bed row which is to be formed, covered with film and seeded, and wherein said severing means comprises:
   c. a knife blade rotatably mounted on said apparatus in a first position above and extending transversely across said film when deposited on said soil seed bed; and
   d. driven means for rotating said knife blade through a stroke of the blade to a second position in a direction toward said soil to sever said film and create an end thereof while during said same stroke burying said end with said knife blade.

2. Apparatus as in claim 1 further comprising:
   a. means for adjusting the elevation of said knife blade with respect to said soil such that, during rotation of said blade, after said film is severed, said blade penetrates said soil a predetermined depth; and
   b. arms associated with said blade to form a Y-shaped profile whereby as said blade is rotated to said second position to sever said film, said blade continues its rotation into said soil to get under and fold said ground film end and enable said arms to carry soil and deposit the soil on said folded ground film end during said movement to said second position to hold said folded ground film end in position on said seed bed.

3. Apparatus as in claim 2 wherein said means for preventing said reel film end from being unreeled during movement of said apparatus to the beginning of another seed bed row comprises:
   a. at least one rotatable press wheel mounted on said apparatus on each side of and in contact with said film when on said ground for pressing said film against said ground;
   b. means for resting said rotatable film reel against said at least one of said rotatable press wheels for being rotated by said press wheel as said press wheel is rotated by contact with said ground;
   c. a blocking arm rotatably attached to said apparatus in a first position away from said press wheel, and
   d. means for rotating said blocking arm toward said ground to a second position to contact said reel film end and force said reel film end against said press wheel so as to prevent rotation of said press wheel which prevents unreeling of said film during movement of said apparatus from the end of a completed seed bed row to the beginning of another seed bed row.

4. Apparatus as in claim 3 further comprising:
   a. motive power means attached to said apparatus for providing motive power thereto, and
   b. means on said motive power means for lifting said apparatus entirely off the ground while moving said apparatus from the end of a completed seed bed row to the beginning of a seed bed row.

5. Apparatus as in claim 4 further comprising:
   a. means on said motive power means to return said press wheels to said ground at the beginning of a seed bed row thereby returning said reel end of said film to said ground,
   b. means for returning said blade from said second position toward and through the ground to said first position so as to carry and deposit soil on said reel end of said film on said ground thereby holding said reel end of said film in contact with said seed bed; and
   c. means for returning said blocking arm from said second position holding said reel end of said film against said press wheel to said first position thereby releasing both said reel end of said film and said press wheel to allow said press wheel to rotate as said apparatus is moved thereby rotating said film reel and causing said film to be unwound from said reel to cover said seed bed.

6. Apparatus as in claim 5 further comprising:
   a. pivotal frame members pivotably attached to said apparatus,
   b. at least one seed wheel attached to at least one of said pivotal frame members,
   c. means for moving said seed wheel toward and away from said seed bed; and
   d. means for mounting said rotatable knife blade on said pivotal frame members such that when said seed wheel is moved away from said seed bed, said knife blade may move from said first position to said second position to sever said film and deposit soil on said ground end of said reel film at the end of a completed seed bed row and return from said second position to said first position to deposit soil on said reel end of said film at the beginning of a seed bed row.

7. Apparatus as in claim 6 further including:
   a. a plough disc mounted on each side and in the front of said apparatus for forming first and second furrows by moving soil toward the center of said apparatus for forming said seed bed;
   b. a levelling cylinder carried by said apparatus for levelling said soil moved toward the center of said apparatus by said discs to form said seed bed; and
   c. a concave disc mounted on each end of said cylinder for compacting the inside edge of said furrows so that said film can be applied to said seed bed securely.

8. In a method of forming a soil seed bed row with mulching apparatus, covering said row with a plastic film from a reel on said apparatus and forming openings in said film by said apparatus through which seeds are planted in said seed bed, the improvement comprising the steps of:
   a. operating a knife on said apparatus through a stroke of said knife by driven means and with said knife severing said film from said reel during said stroke at the end of a seed bed row to leave a seed bed end and a reel end of said film;
   b. during some stroke of said knife depositing soil on said seed bed end of said film with said knife to hold said film in place on said seed bed,
   c. preventing said reel end of said film from unwinding from said reel by setting a brake on said apparatus during movement of said apparatus from the end of a completed seed bed row to the beginning of another seed bed, d. depositing soil on the reel end of said film with a further driven operation of said knife at the beginning of said another seed bed row to hold said film in place; and e. allowing rotation of said film reel by releasing said brake during movement of said apparatus while forming said another seed bed row thereby depositing a film cover over said another seed bed row.

* * * * *

UNITED STATES PATENT AND TRADEMARK OFFICE
CERTIFICATE OF CORRECTION

PATENT NO. : 4,953,482
DATED : September 4, 1990
INVENTOR(S) : Emily, Jean-Yves

It is certified that error appears in the above–identified patent and that said Letters Patent is hereby corrected as shown below:

Column 7, line 25, cancel "the" and substitute therefor--said--; and

Column 8, line 64 cancel "some" and substitute therefor--the same--.

Signed and Sealed this

Third Day of March, 1992

Attest:

HARRY F. MANBECK, JR.

Attesting Officer

Commissioner of Patents and Trademarks